United States Patent [19]

Ikenberry

[11] Patent Number: 5,340,236
[45] Date of Patent: * Aug. 23, 1994

[54] BURN CHAMBER FOR USE IN A SYSTEM FOR HEATED AIR EXTRACTION OF CONTAMINANTS FROM A SOIL STACK

[75] Inventor: Maynard D. Ikenberry, Olympia, Wash.

[73] Assignee: HAVE Limited Partnership, Tumwater, Wash.

[*] Notice: The portion of the term of this patent subsequent to May 25, 2010 has been disclaimed.

[21] Appl. No.: 29,687

[22] Filed: Mar. 11, 1993

Related U.S. Application Data

[63] Continuation-in-part of Ser. No. 766,044, Sep. 26, 1991, Pat. No. 5,213,445.

[51] Int. Cl.⁵ ................................. B09B 3/00
[52] U.S. Cl. ........................ 405/128; 405/131; 405/258
[58] Field of Search ............ 405/128, 129, 131, 258, 405/263

[56] References Cited

U.S. PATENT DOCUMENTS

| | | | |
|---|---|---|---|
| 4,839,061 | 6/1989 | Manchak et al. | 405/128 X |
| 4,842,448 | 6/1989 | Koerner et al. | 405/258 |
| 4,849,360 | 7/1989 | Norris et al. | 435/264 |
| 4,895,085 | 1/1990 | Chips | 405/128 X |
| 4,919,570 | 4/1990 | Payne | 405/128 |
| 4,973,811 | 11/1990 | Bass | 219/10.57 |
| 4,982,788 | 1/1991 | Donnelly | 405/131 |
| 5,011,329 | 4/1991 | Nelson et al. | 405/128 |
| 5,018,576 | 5/1991 | Udell et al. | 405/131 X |
| 5,035,537 | 7/1991 | Rose | 405/128 |
| 5,067,852 | 11/1991 | Plunkett | 405/128 |
| 5,213,445 | 5/1993 | Ikenberry et al. | 405/128 |

*Primary Examiner*—David H. Corbin
*Attorney, Agent, or Firm*—Jensen & Puntigam

[57] ABSTRACT

A burn chamber for a recirculating system for remediation of contaminated soil, the burn chamber including a burn chamber housing, the housing having an inlet (152) and an opposing outlet (164). Contaminate-containing vapors moving into the interior of the burn chamber through the inlet (152) are directed through grill members (170 and 172) into flame areas produced by burners (174 and 176), with the vapors then being circulated by a baffle member (198) positioned near the front of the chamber housing and then through grill members (190 and 192), which are oriented to direct the vapors around the ends of the baffle (198) and out the outlet (164) to the remainder of the recirculating system.

7 Claims, 4 Drawing Sheets

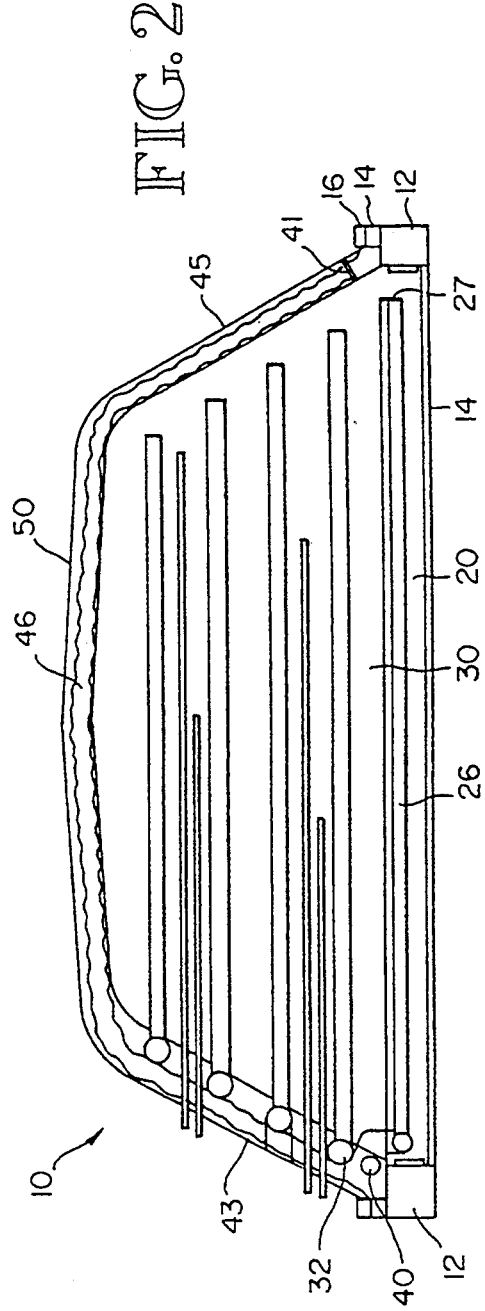
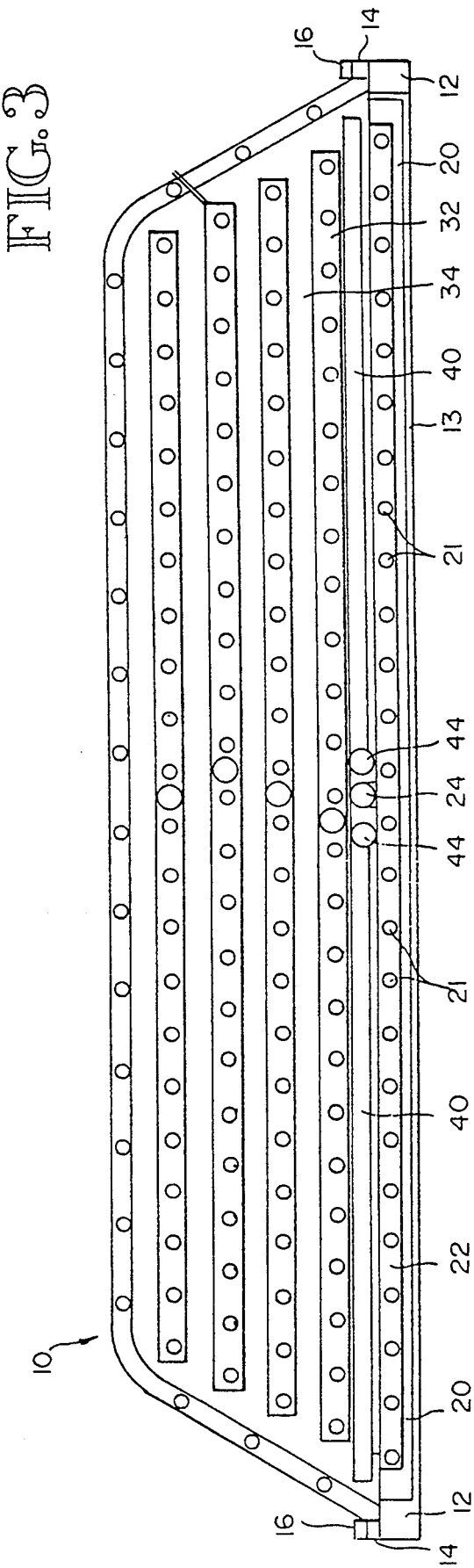

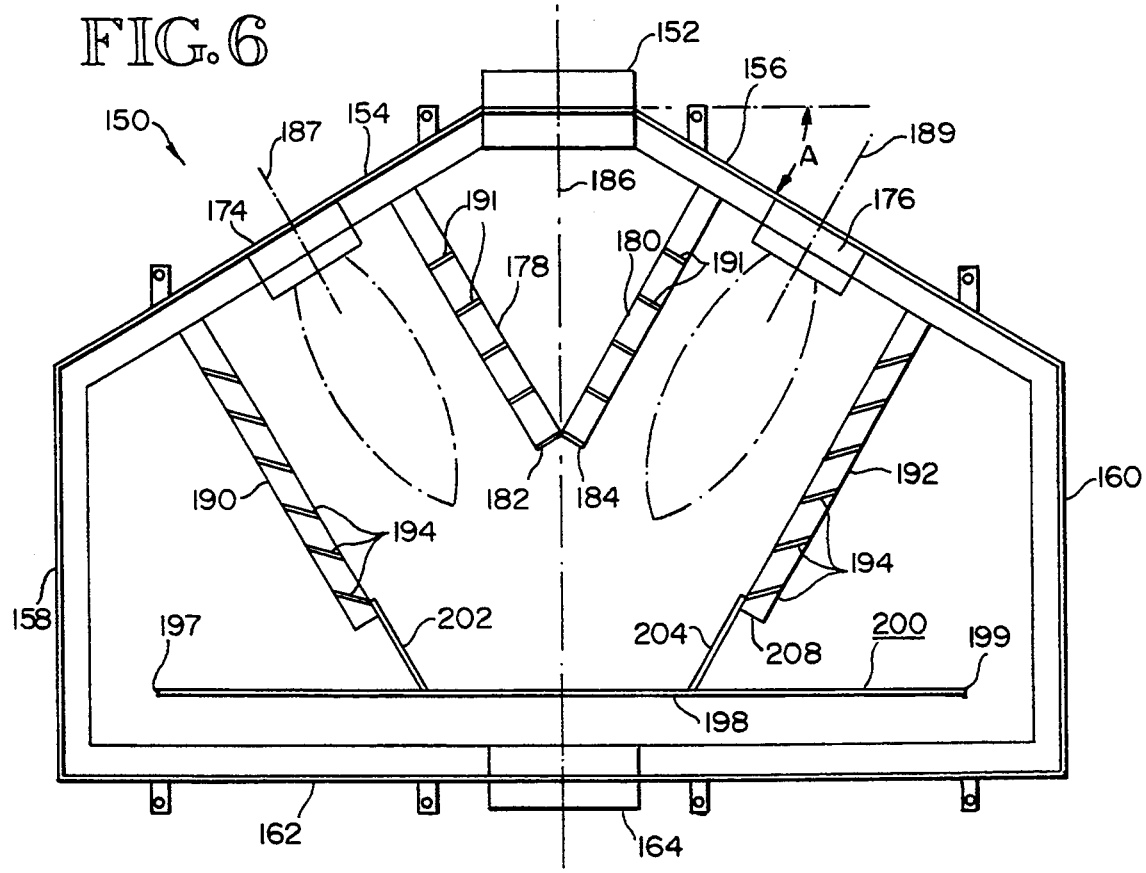
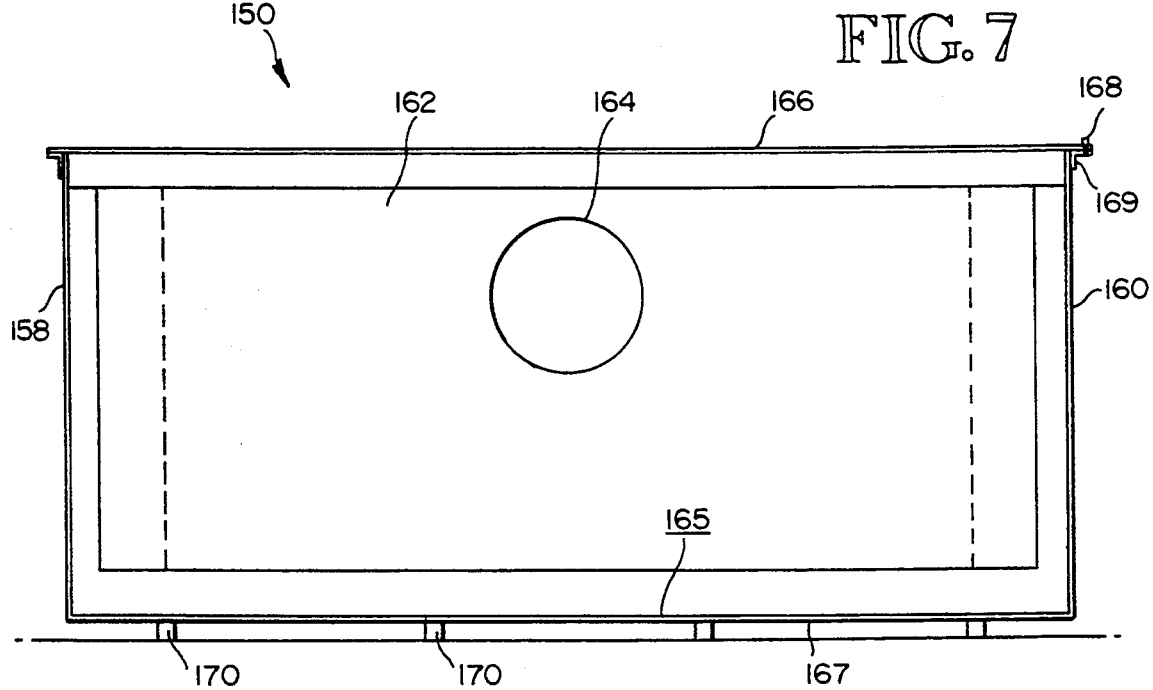

BURN CHAMBER FOR USE IN A SYSTEM FOR HEATED AIR EXTRACTION OF CONTAMINANTS FROM A SOIL STACK

This application is a continuation-in-part of U.S. application Ser. No. 07/766,044, filed on Sep. 26, 1991 in the name of Maynard D. Ikenberry and Dwight S. Ikenberry, now U.S. Pat. No. 5,213,445.

TECHNICAL FIELD

This invention generally concerns the art of remediation of contaminated soil and more particularly concerns a burn chamber which is used in a system for on-site soil remediation using heated air.

BACKGROUND OF THE INVENTION

Over the past several years, there has been increasing environmental concern over soil contamination. There are various well-known sources of contamination, including underground petroleum storage tanks used by gasoline service stations and the like. As a result of this increasing environmental concern, government regulations have come into force which place strict controls over such underground storage tanks and which will, over a period of years, eventually require replacement of a significant percentage of existing tanks. As part of the process of removing and replacing such underground storage tanks, a significant amount of the surrounding soil, typically in the range of 100–1000 cubic yards, must be removed and then treated to remove any contaminants which may have leaked from the tanks. Treatment of the soil, generally referred to as remediation, can be accomplished in several ways, including removing and disposing of the soil, or treatment of the soil on site. Disposal of contaminated soil is typically quite expensive and requires new soil to replace the soil which has been removed. In addition, such soil still is contaminated, and thus, the basic contamination problem is only moved to another, albeit typically more remote, location.

Many different systems are used for on-site soil treatment. Typically, many of these systems involve drilling a plurality of extended wells on the site, forcing the vaporization of the contaminants in some manner and then permitting the vaporous contaminants to escape through the wells. Two such systems are shown in U.S. Pat. No. 4,842,448 to Koerner and U.S. Pat. No. 4,982,788 to Donnelly. However, such methods are also quite expensive, often ineffective, and take an exceptionally long time to complete, typically on the order of 6 to 18 months. Also, many of these systems release the vaporous contaminants to the atmosphere, a practice which is also now becoming increasingly unsatisfactory, and in many areas is not even permitted, due to air quality restrictions. When the contaminants produced by on-site treatment systems are not released to the atmosphere, they are typically treated by a completely separate system, which adds to the expense and complexity of the overall process. In another on-site treatment approach, shown in U.S. Pat. No. 4,919,570 to Payne, the soil is removed and treated in a plurality of treatment vessels. While such a system can be effective, it is inherently limited to rather small volumes of soil, and again is typically expensive and somewhat complex to operate.

Thus, in view of the increasing emphasis on soil remediation relative to underground storage tank facilities, a significant need has developed for a system for efficiently and inexpensively removing contaminants from soil surrounding storage tanks.

DISCLOSURE OF THE INVENTION

Accordingly, the present invention is a burn chamber for use in a system for remediation of contaminated soil which has been removed from a soil site, the remediation system including a recirculating system for heating air and destroying contaminants present in contaminated vapors which have been released from a soil stack formed from the removed soil, in response to the heated air being moved into the soil stack, the burn chamber comprising: a burn chamber housing; an inlet for contaminate-containing vapors at a rear portion of the burn chamber housing; a pair of burners positioned in sidewalls of the burn chamber housing on opposite sides of the inlet, each burner producing flame areas which extend into the interior of the burn chamber; a first pair of grill members extending interiorly of the burn chamber housing on both sides of the inlet, angled toward each other such that the vapors from the inlet are directed through the first pair of grill members into the flame areas; a baffle element extending across a substantial portion of the burn chamber housing near a front end thereof; a second pair of grill members extending in the burn chamber housing between the flame areas, respectively, and the baffle element, such that vapors moving through the flame areas are directed by the baffle slightly rearwardly through the second pair of grill members and then around opposing ends of the baffle member and out said outlet.

BRIEF DESCRIPTION OF THE DRAWINGS

FIG. 2 is a lateral cross-sectional view of the soil stack used in the system of the present invention.

FIG. 3 is a longitudinal cross-sectional view of the soil stack used in the system of the present invention.

FIG. 6 is a top plan view of an alternative burner portion.

FIG. 7 is a front elevational view of the burner of FIG. 6.

BEST MODE FOR CARRYING OUT THE INVENTION

Very simply, the remediation system disclosed herein initially includes the formation of a soil stack at the site of the contaminated soil, e.g. where underground petroleum storage tanks have been removed. The contaminated soil is removed from its location to an adjacent location at ground level. The soil stack comprises alternating layers of contaminated soil and hot air pipe networks or grids. Over the top of the completed soil stack is positioned a grid or network of vapor pipes, with a sealing layer of air-impermeable material covering the entire soil stack. Connecting members extend through the sealing layer from the hot air pipes and the vapor pipes.

The system further includes a burner apparatus which heats air to a selected temperature, the heated air then being moved into the hot air pipes in the soil stack. The hot air circulating through the soil stack releases the contaminants in the soil in the form of vapor. The vapor is collected by the vapor pipes and moved out of the soil stack and into the burner, where the contaminants are destroyed to an acceptably safe level. The entire system is essentially closed so that only a small amount of contaminants is occasionally vented to the atmosphere. In some instances, such as when required by local air pollution control authorities, the small amount of contaminants which are exhausted are directed through a high temperature catalytic reactor to destroy those contaminants. When the contaminants in the soil stack have been sufficiently reduced, the soil stack is dismantled, and the remediated soil is then placed back in its original location.

Figure 1:
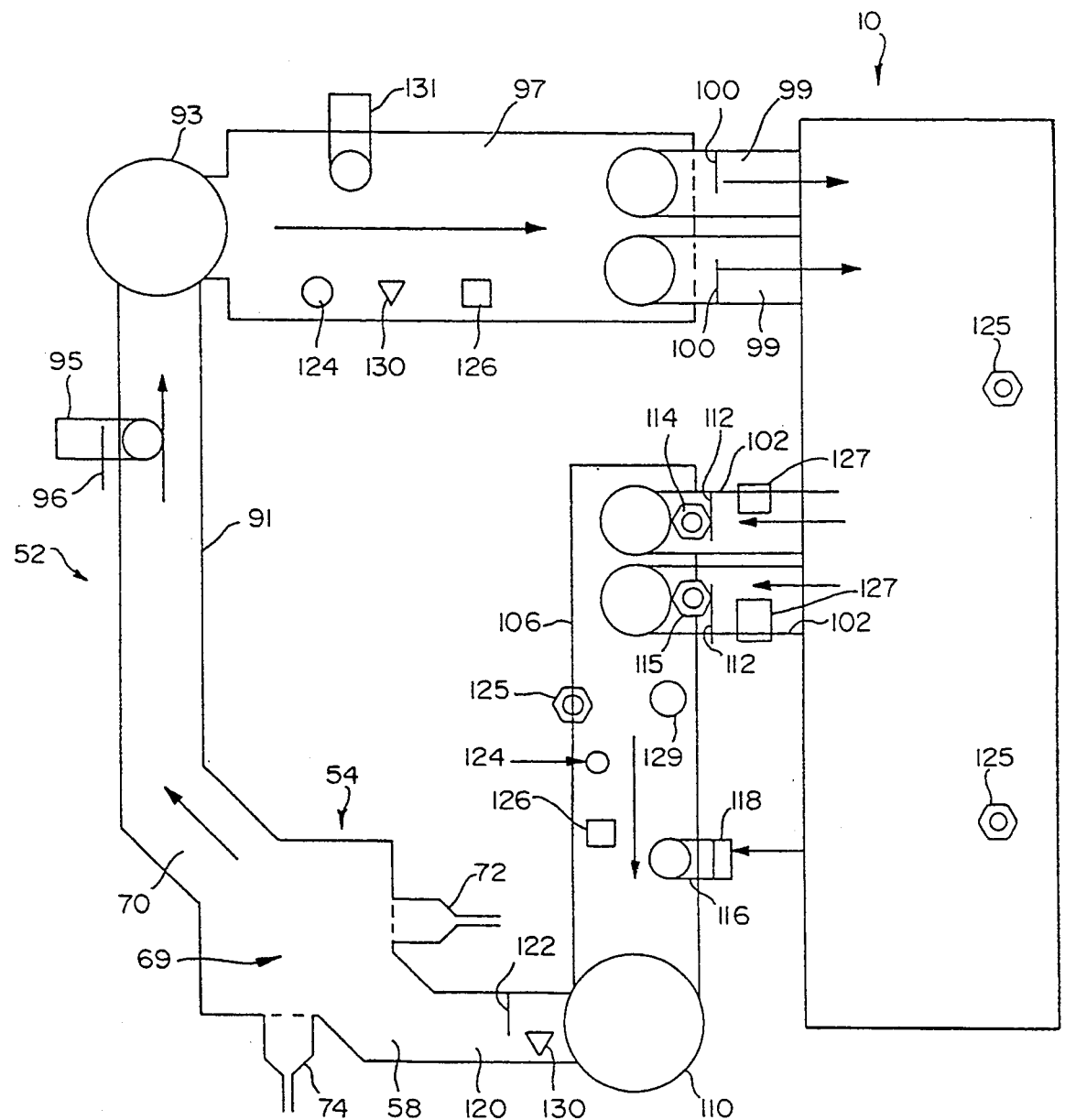
FIG. 1 is a schematic view of the overall contaminant-removal system of the present invention.

FIGS. 2 and 3 show the details of the soil stack portion of system, while FIG. 1 shows the relative arrangement of the soil stack and the contaminant treatment apparatus portion of the system. In the construction of a soil stack, shown generally at 10, bales of straw or similar material are laid end-to-end, forming the outline of the base of the soil stack. The line of straw bales is shown generally at 12 in the form of a berm in FIGS. 2 and 3. The soil stack is typically but not necessarily rectangular in configuration, and for purposes of illustration could be approximately 54 feet long by 30 feet wide. One end of the soil stack is initially left open, i.e. temporarily without straw bales, to provide access for earthmoving equipment to form the soil stack. Following completion of the soil stack, the berm for that portion is completed so that the berm 12 extends around the entire perimeter of the soil stack. After the initial open-ended berm has been formed, a first support ridge 14 of a single layer of 2×6 wood boards is positioned on the top surface of the straw berm 12, around the entire length thereof.

A lower sealing member 13, such as six mill thick visqueen, is then placed over the area defined by the berm 12, forming the bottom layer of the soil stack 10. Typically, lower sealing member 13 extends up the interior sides of the berm and over the top of the first support ridge 14. A second support ridge 16, also comprising, in the embodiment shown, a layer of 2×6 wood boards, clamps the lower sealing member (as well as an upper sealing member as explained below) in place, producing a sealing effect around the base of the soil stack 10. At this point, actual placement of contaminated soil in the soil stack begins.

A first layer 20 of contaminated soil is then placed over lower sealing member 13 to a thickness of approximately 8–10 inches. Typically, the upper surface of the first layer 20 is smoothed out, without packing down the soil, which would decrease the efficiency of the system. A first 12-inch diameter hot air distribution header pipe 22 is positioned along the length of one longitudinal side of the stack along the inside surface of berm 12. Hot air distribution header pipe 22 is a conventional, commercially available pipe made of 24 gauge galvanized sheet metal. While pipe 22 in the embodiment shown is 12 inches in diameter, it should be understood that other sizes can be used. Hot air distribution header pipe 22 has a plurality of interior connections 21—21 along the length thereof, and one exterior connection 24.

Connected to the interior connections 21—21 and extending therefrom substantially all the way laterally across the soil stack 10 are a plurality of hot air dispensing pipes 26—26. Hot air dispensing pipes 26 are perforated along the length thereof, are approximately 4 inches in diameter, and are spaced at 2-foot intervals in the embodiment shown. It should be understood, however, that the spacing and diameter of pipes 26 can vary. The pipes 26 are all capped at the far ends 27 thereof. Hence, in operation, hot air coming in through exterior connection 24 moves through the distribution header pipe 22 and then out through dispensing pipes 26—26 into the soil, basically covering the area of the soil stack 10 for a given vertical distance.

A second layer of contaminated soil 30 is then placed on top of the hot air dispensing pipes 26. The second layer 30 is approximately 24 inches high, although this could be varied, such as within a range of 10–30 inches. A second network of a hot air distribution header pipe and a plurality of hot air dispensing pipes is then placed on top of the second layer of contaminated soil 30. Alternating layers of contaminated soil and hot air pipe networks are successively positioned until the soil stack 10 is finished. Typically, the height of a completed soil stack will be approximately 10 feet, although this can be varied. Generally, however, it is preferable to have the soil stack somewhat less than 10 feet, and spread over a broader area if necessary and space permits.

Two 12-inch diameter vapor-collection header pipes 40—40 are positioned end-to-end on top of the straw bale berm 12, close to and parallel with the hot air distribution header pipe 22. The vapor-collection header pipes 40—40, which are in registry, each include a plurality of upwardly pointing interior connections along the length thereof and one exterior connection 44 at one end thereof. The exterior connections 44 for the vapor-collection header pipes 40—40 are located at the interior ends of each pipe, and are hence closely adjacent to each other.

Extending over the soil stack 10, i.e. up the longitudinal side 43 of soil stack 10 from the vapor-collection header pipes 40—40, over the top of the soil stack 10 and then down the other side 45, are a plurality of vapor-extraction pipes 46—46. The vapor-extraction pipes 46—46 are typically made from a flexible material, are 4 inches in diameter and perforated along the lengths thereof in the embodiment shown and are located at 2-foot intervals along the length of the vapor-collection pipes 40—40, connecting with the interior connections of the vapor-collection header pipes 40—40. The vapor extraction pipes 46—46 typically extend down to the berm on the other side of the stack from the vapor collection pipes 40—40.

Positioned over the entire soil stack, including the vapor-extraction pipes 46—46, as well as the vapor-collection header pipes 40—40 and the hot air distribution header pipes, is an air-impermeable upper sealing member 50 which in the embodiment shown is also made of six mill thick visqueen material. Any seams in the visqueen member 50 are carefully and securely taped. Openings in the visqueen member 50 are provided for the exterior connections of the vapor-collection header pipe and the hot air distribution header pipe. Sealing member 50 is pulled tightly over the soil stack and anchored at the lower edges of the soil stack between the two support ridges 14 and 16, along with the peripheral edge of lower sealing member 13. This system is designed to prevent escape of any vapors/contaminants from the soil stack to the atmosphere.

Figure 4:
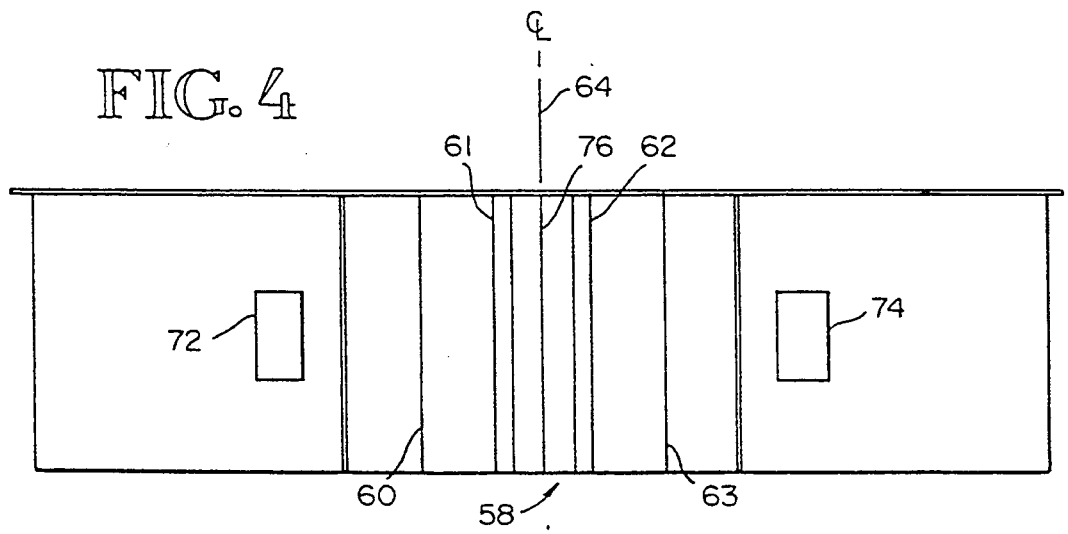
FIG. 4 is a side elevational view of the burner portion of the system of the present invention.
Figure 5:
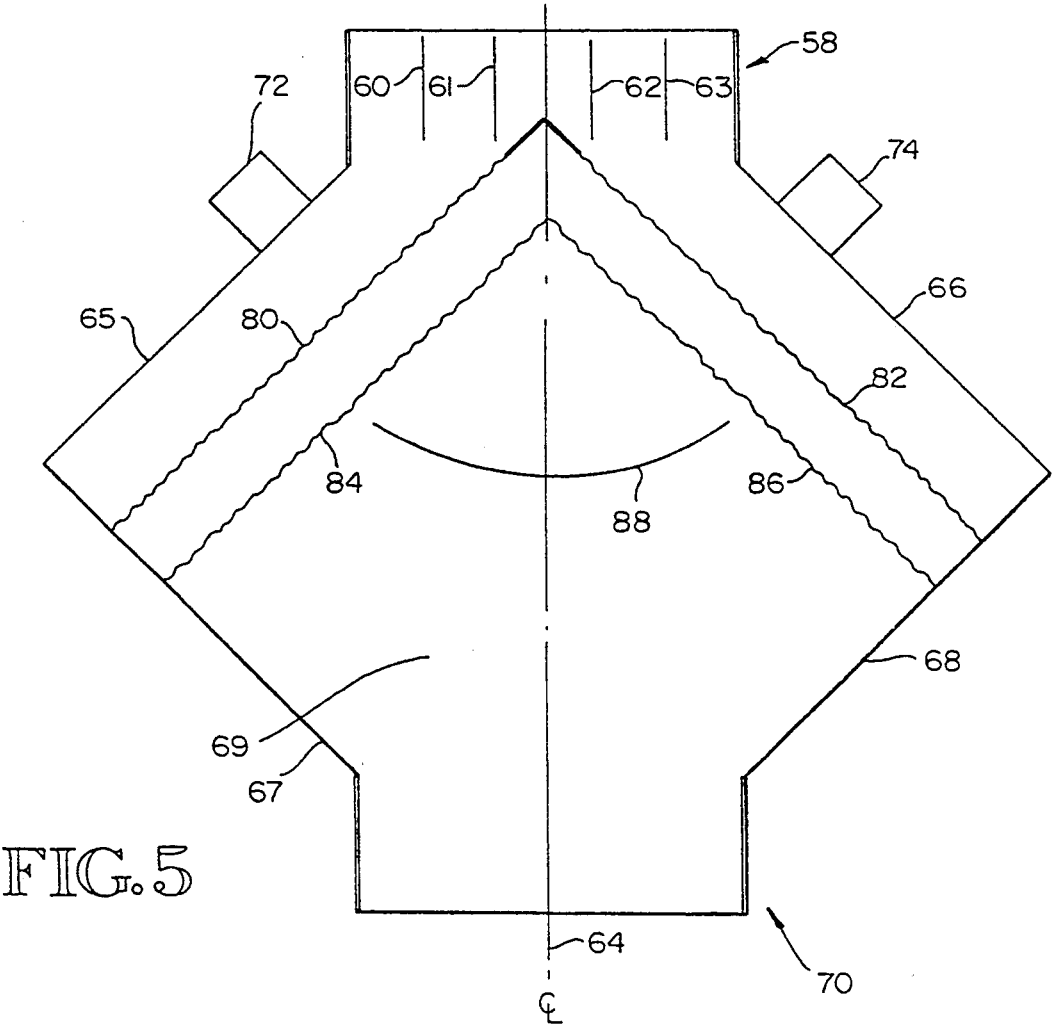
FIG. 5 is a top view of the burner portion of the system of the present invention.

At this point, the soil stack 10 is connected to the hot air vapor-extraction system, which is referred to generally in FIG. 1 at 52. A key portion of the vapor-extraction system shown generally at 52 is an incinerator or burn chamber shown generally at 54. The burn chamber 54 is shown in detail in FIGS. 4 and 5. It includes an inlet portion 58 which in the embodiment shown is 12 inches high by 16 inches wide and approximately 6 inches deep. Positioned in inlet 58 are a series of solid vertical vanes 60–63, spaced 2 inches and 5 inches away from center line 64, on both sides thereof. The centermost two vanes 61 and 62 are each 2 inches wide, while the outer two vanes 60 and 63 are 3 inches wide in the embodiment shown.

Flaring outwardly from the interior end of inlet 58 are two outside walls 65 and 66, which extend at an angle of approximately 135° relative to inlet 58 and are thus 90° apart from each other. Walls 65 and 66 are each approximately 12 inches high and 18 inches long. Connected to the far ends of outside walls 65 and 66 are outside walls 67 and 68, which extend inwardly toward each other at an angle of 90° relative to outside walls 65 and 66. Outside walls 67 and 68 terminate in an outlet portion 70 which is in registry with and the same approximate size as inlet 58, on the direct opposite side of the burn chamber from inlet 58.

The burn chamber 54 also includes top and bottom walls which extend over the entire area of the burn chamber, thereby with the above-described elements defining an enclosed chamber. All of the above-described elements comprising the burn chamber 54 are made in the embodiment shown from steel plates approximately ⅜-inch thick. Positioned in outside walls 65 and 66 near inlet 58 are two propane burners 72 and 74. Propane burners 72 and 74 provide the required heat for the burn chamber 54 as discussed hereinafter. Positioned within the burn chamber 54 at center line 64, approximately at the intersection of inlet 58 and the main interior region 69 of the burn chamber, is an angle iron section 76 which extends from top to bottom of the burn chamber and is approximately 2 inches on each side with the angle iron section 76 flaring outwardly into the main interior region 69 of the chamber.

Extending from the free ends of the angle iron section 76, parallel with outside walls 65 and 66, respectively, to outside walls 67 and 68 are expanded metal members 80 and 82. The expanded metal members have slots therein such that they are about 50% open. Two additional expanded metal walls 84 and 86 are positioned parallel with walls 80 and 82, approximately 3 inches therefrom. Farther into the main interior region 69 of the burn chamber is a curved baffle element 88 which extends from a point approximately mid-length of, and one inch away from, expanded metal wall 84, curves slightly toward outlet portion 70 and then back toward expanded metal wall 86, terminating approximately one inch away therefrom.

In operation, this arrangement results in air and contaminated vapors which come into inlet portion 58 dispersing around the angle iron section 76, moving through a flame region produced by the propane burners, and then around to the front of the baffle 88 and out outlet portion 70. This arrangement insures the circulation of air through the burn chamber to achieve maximum destruction of the contaminants.

Referring to FIG. 1, from outlet portion 70, a first air duct section 91, having the same cross-sectional outline as outlet portion 70, extends to a first blower 93. Located shortly before first blower 93 is a fresh-air intake vent 95 with a damper element 96 therein. A second air duct section 97 extends from blower 93 to soil stack 10. An exhaust member 131 is positioned in air duct section 97 just downstream of blower 93. A plurality of connecting ducts 99, each having damper elements 100 therein, connect air duct section 97 with the individual hot air distribution headers in the soil stack. For purposes of illustration, two connecting ducts 99 are shown. However, it should be understood that "T" connections and/or additional connecting ducts are used in an actual system, depending upon the number of hot air distribution headers used in the soil stack. The damper elements 100 provide control over the movement of heated air into the soil stack 10.

Extending from the vapor collection header pipes (the exterior connections thereof) in the soil stack to a third air duct section 106 are connection ducts 102—102. Located in the connection ducts 102—102 are damper elements 112, which control the flow of vapors out of the soil stack 10. Test ports 114–115 are located in connection ducts 102—102 for convenient testing of the vapors extracted from the soil stack. Air duct section 106 extends to a second blower 110. Positioned in the air duct 106, in the vicinity of blower 110, is a fresh-air intake vent 116 having a damper element 118 therein. Extending from blower 110 to burn chamber inlet portion 58, completing the closed vapor-extraction system, is a fourth air duct section 120. A damper element 122 is positioned in air duct section 120, slightly downstream of blower 110.

Several other system test instruments are positioned at various points in the vapor-extraction system. In the embodiment shown air-flow meters 124—124 and temperature gauges 126—126 are positioned in air duct sections 97 and 106 while static pressure gauges 130—130 are positioned in air duct sections 97 and 120, just downstream of blowers 93 and 110. Additional test ports 125—125 are provided in the soil stack 10 and duct section 106 to test the vapors from the soil stack. Lastly, additional air flow meters 127 are positioned in connection ducts 102—102, and a LEL (lower explosive level) monitoring port 129 is positioned in air duct section 106.

In operation, after system start-up has been completed, during which the blowers are run for a period of 10 minutes or so prior to turn-on of burners 72 and 74 and following assurance that the vapor stream is not at an explosive level (obtained through monitoring port 129) the burners are ignited, heating the air in the burn chamber to approximately 275°–300° F. With both of the blowers 93 and 110 on, damper elements 100—100 and 122 are adjusted to insure efficient burner performance. The temperature of the hot air stream is continuously monitored in air duct section 97 by temperature gauge 124. The heated air proceeds in through connection ducts 99—99 to the various hot air distribution headers and from there into the perforated hot air dispensing pipes and the contaminated soil.

The movement of the hot air through the soil volatilizes the contaminants, with the vapor moving up through the soil stack 10 to the top thereof, where the vapors are collected by the various vapor extraction pipes and then move to the vapor-collection headers. The collected vapors then move through the connecting ducts 102—102 into air duct section 106. The contaminant level of the vapor stream is continuously monitored by conventional monitoring equipment through test ports 114–115 in air duct section 106, as well as through test ports 125—125 in the soil stack. Typically, a data collection system and computer station is included which receives the information from the test ports, controls the dampers and provides displays and/or reports on the operation of the system and the contaminant level. Appropriate alarms can be provided should specified conditions be reached.

The vapor flow from the soil stack is drawn by blower 110 and then directed into burn chamber 54, where the contaminants are destroyed to an acceptable level. Fresh air is taken into the system through fresh air intake vents 95 and 116, controlled by the dampers therein. A pressure balancing exhaust element 131 is provided in air duct section 97 and operates when needed, relative to the amount of fresh air taken into the system. Hence, the overall system is substantially closed. The contaminants released from the soil stack are continuously recirculated to the burn chamber. A small amount of contaminants may be released to the atmosphere through the pressure balancing exhaust element 131. This small amount of contaminants may be directed to a catalytic reactor or similar system for destruction, if necessary.

When the contaminant level from the soil stack has been reduced to a desired level, soil samples are typically taken from the stack and sent out for analysis to verify the completion of the remediation process in accordance with state and/or local law. A full report is then typically produced based on the data collected during operation of the system.

At this point, the operation of the vapor-extraction system is terminated, and the system is disconnected from the soil stack. The soil stack is then dismantled by first removing the upper sealing member, then the vapor pipes, and then gradually and carefully removing the soil and hot air pipes, beginning at one end of the stack. The remediated soil is then returned to its original location, or otherwise disposed of if so required, while the hot air and vapor-extraction pipes are prepared for further use.

The process is typically completed at a given site within 7 to 14 days, which is significantly faster than existing on-site systems, and is typically considerably less expensive. Also, being an on-site remediation system, the soil is typically constructively reused instead of having to be disposed of in some manner.

An alternative burn chamber useful with the system described above is shown in FIG. 6 and 7. The burn chamber in FIGS. 6 and 7 is referred to generally at 150. Burn chamber 150 includes an inlet 152 which is rectangular in shape, having opening dimensions of approximately 12⅛ inches in height by 9⅜ inches in width. Extending outwardly from inlet 152 are two rear walls 154 and 156. Rear walls 154 and 156 extend forwardly from the inlet 152 at an angle A of approximately 30 degrees. Rear walls 154 and 156 are each approximately 26½ inches long and approximately 27 inches high. Inlet 152 is located approximately at mid-height of rear walls 154 and 156.

Extending directly forwardly from the outboard ends of rear walls 154 and 156 are sidewalls 158 and 160. Sidewalls 158 and 160 are approximately 24 inches long by 27 inches high. A front wall 162 joins the two sidewalls 158 and 160. Front wall 162 is approximately 60 inches long and also 27 inches high. Positioned at mid-length of front wall 162 is an outlet 164. Outlet 164 is circular, approximately 9 3/16 inch in diameter. The center of outlet 164 is 18⅞ inches up from the lower edge 165 of front wall 162.

The burn chamber 150 also includes a top 166 and bottom 167, which complete the enclosure. Top 166 is arranged so as to be removable via a series of bolts 168 which connect the top 166 to angle iron elements 169 which are welded to the outsides of the front wall, the sidewalls and the rear walls. The burn chamber walls as well as the top and bottom are made from ¼-inch steel plates and the front wall, sidewalls and rear walls are all lined with 2 inches of ceramic insulation. The bottom 167 is lined with 2 inches of fire brick insulation, while the top 166 is lined with 3½ inches of ceramic insulation. In the embodiment shown, burn chamber 150 itself is supported off the floor by 1-inch square steel support members 170.

Positioned in rear walls 154 and 156, approximately mid-length and mid-height thereof, are two burners 174 and 176. The burners may be either propane or natural gas fuel burners or even diesel fuel burners. In the embodiment shown, an approximately 1800° F. flame envelope is produced by each burner in the interior of the burn chamber.

Extending into the interior of the burn chamber 150 from rear walls 154 and 156 are a first set of grill members 178 and 180. Grill members 178 and 180 are each approximately 16½ inches long by 22 inches high and extend from walls 154 and 156 at right angles thereto, such that the free ends 182 and 184 thereof meet at a point which is approximately on center line 186 of the burn chamber. The first set of grill members thus forms a "V" in front of the inlet 152. Each grill member 178, 180 comprises a series of five vertical stainless steel slats 191, joined at the upper and lower ends thereof by upper and lower bracing members. Each slat 191 is ¼-inch thick by 1½ inches wide and is oriented to be parallel with rear walls 154 and 156. Grill members 178 and 180 are spaced approximately 6 inches to the rear of the center lines 187, 189 of rear walls 154 and 156.

Located approximately 7 inches forward of center lines 187 and 189 are two grill members 190 and 192, which form a second set of grill members. Grill members 190 and 192 also extend, respectively, interiorly of the burn chamber from, and at right angles to, rear walls 154 and 156, such that they are parallel to grill members 178 and 180. Each grill member 190, 192 is approximately 20 inches long and approximately 22 inches high and comprises a series of vertical stainless steel slats 194 connected at the upper and lower ends thereof by upper and lower bracing members. Slats 194 in the embodiment shown are approximately 1½ inches wide by ¼-inch thick; in the embodiment shown there are a total of six such slats in each grill member 190, 192, arranged at an angle of 45° to the length dimension of the grill member.

Positioned at the front interior of the burn chamber 150 is a stainless steel baffle element 198. In the embodiment shown, baffle 198 is approximately 48 inches long and approximately 22 inches high; extending between the fire brick insulation on the bottom of the burn chamber to the ceramic insulation on the top. The baffle element 198 is located approximately 3 inches inboard from the front wall 162, and is centered on the front wall, such that there are approximately 4 inches of space between the respective ends 197, 199 of the baffle 198 and the sidewalls 158, 160. The baffle 198 is made of ¼-inch stainless steel.

Extending from the inboard surface 200 of baffle 198 are two angled wing elements 202 and 204. Each wing element is approximately 6 inches long and extends outwardly at a 60° angle from the inboard surface 200 of the baffle. The wings 202 and 204, in the vicinity of the free ends thereof, are connected to the interior ends 206, 208 of grill members 190 and 192.

The above-identified burn chamber is designed to be highly efficient in the destruction of contaminants and further is designed to produce vapor stream temperatures in the range of 350°-650° F., i.e. the temperature of the vapor stream entering the soil stack will be approximately 350°-650° F. While the temperature range disclosed above for the system of FIGS. 1-5 is suitable for the destruction of the lighter weight petroleum hydrocarbons such as gasoline, the higher temperatures of the embodiment of FIGS. 6-7 (particularly the upper end of that range) are used for the destruction of the heavier weight petroleum hydrocarbons, including diesel, fuel oil, jet fuel, etc.

In operation, contaminated vapor enters burn chamber 150 through inlet 152. This vapor stream is directed by the grill members 170 and 172 into the envelope of flame produced by the burners 174 and 176, which in the embodiment shown is approximately 1800° F. The stainless steel baffle 198, including wing elements 202 and 204, redirect and circulate the vapor stream back through the flame envelope. The vapor stream encounters turbulence within the flame envelope created by grill members 190 and 192.

The vapor stream then passes through grill members 190 and 192 and exits the burn chamber through outlet 164 by passing around the ends of baffle member 198. From there, the vapor stream is directed through the high pressure blower and then back into the soil stack, as described in detail above. The vapor stream has an approximately 0.5 second residence time in the burn chamber, which results in a maximum destruction of the contaminants in the vapor stream.

Although a preferred embodiment of the invention has been disclosed herein for illustration, it should be understood that various changes, modifications and substitutions may be incorporated in such embodiment without departing from the spirit of the invention as defined by the claims which follow.

I claim:

1. A burn chamber for use in a system for remediation of contaminated soil which has been removed from a soil site, the remediation system including a recirculating system for heating air and destroying contaminants present in contaminated vapors which have been released from a soil stack formed from the removed soil, in response to the heated air being moved into the soil stack, the burn chamber comprising:
    a burn chamber housing;
    an inlet for contaminate-containing vapors at a rear portion of the burn chamber housing;
    an outlet at a front portion of the burn chamber housing;
    a pair of burners positioned in sidewalls of the burn chamber housing on opposite sides of the inlet, each burner producing flame areas which extend into the interior of the burn chamber;
    a first pair of grill members extending interiorly of the burn chamber housing on both sides of the inlet, angled toward each other such that the vapors from the inlet are directed through the first pair of grill members into the flame areas;
    a baffle element extending across a substantial portion of the burn chamber housing near a front end thereof;
    a second pair of grill members extending in the burn chamber housing between the flame areas, respectively, and the baffle element, such that vapors moving through the flame areas are directed by the baffle slightly rearwardly through the second pair of grill members and then around opposing ends of the baffle member and out said outlet.

2. An apparatus of claim 1, wherein the second pair of grill members is substantially parallel with the first pair of grill members.

3. An apparatus of claim 2, wherein the burn chamber housing includes top and bottom elements and wherein the first and second pair of grill members and the baffle member extend from the bottom element to the top element.

4. An apparatus of claim 3, wherein the first pair of grill members extends from interior surfaces of the burn chamber housing and are joined together at interior ends thereof, in front of the inlet, and wherein the first pair of grill members comprises first and second grill members, each comprising a plurality of spaced vertical slats oriented at approximately right angles to the direction of the flame areas.

5. An apparatus of claim 4 wherein the second pair of grill members comprises third and fourth grill members which each comprise a plurality of spaced vertical slats, oriented to direct vapors circulating from the baffle member toward opposing sides of the burn chamber housing and then around said opposing ends of the baffle member, and wherein the baffle member includes wing-like elements which extend rearwardly from a rear surface thereof, the wing-like elements mating with interior ends of the third and fourth grill members.

6. An apparatus of claim 1, wherein the temperature of the flame areas is such that the vapors at the outlet of the burn chamber housing are within the range of 350°-650° F.

7. A burn chamber for use in a system for remediation of contaminated soil which has been removed from a soil site, the remediation system including a recirculating system for heating air and destroying contaminants present in contaminated vapors which have been released from a soil stack formed from the removed soil, in response to the heated air being moved into the soil stack, the burn chamber comprising:
    a burn chamber housing;
    an inlet for contaminate-containing vapors at a rear portion of the burn chamber housing;
    an outlet at a front portion of the burn chamber housing;
    a pair of burners positioned in sidewalls of the burn chamber housing on opposite sides of the inlet, producing flame areas which extend into the interior of the burn chamber;
    a first pair of slotted members which extend on both sides of the inlet across a portion of interior of the burn chamber housing;
    a second pair of slotted members positioned forward of the first pair of slotted members; and
    a baffle element extending across a portion of the burn chamber housing, approximately central of a center line therethrough.

* * * * *